(12) United States Patent
Reno

(10) Patent No.: US 8,260,127 B2
(45) Date of Patent: Sep. 4, 2012

(54) LIGHTING MODIFIABLE PHOTO BOOTH WITH EXTERNAL PROCESS CONTROL

(76) Inventor: Robert Reno, Riverview, MI (US)

( * ) Notice: Subject to any disclaimer, the term of this patent is extended or adjusted under 35 U.S.C. 154(b) by 0 days.

(21) Appl. No.: 13/036,453

(22) Filed: Feb. 28, 2011

(65) Prior Publication Data

US 2011/0211819 A1 Sep. 1, 2011

Related U.S. Application Data

(60) Provisional application No. 61/308,398, filed on Feb. 26, 2010.

(51) Int. Cl.
*G03B 15/00* (2006.01)
(52) U.S. Cl. .............. 396/2; 348/586; 358/1.6; 700/237
(58) Field of Classification Search ... 396/2; 348/207.2; 315/291; 95/14; D16/215; 52/27.5, 36.1; 194/201
See application file for complete search history.

(56) References Cited

U.S. PATENT DOCUMENTS

| | | | |
|---|---|---|---|
| 2,796,812 A * | 6/1957 | Koci | 396/2 |
| 2,832,275 A * | 4/1958 | Applegate | 396/2 |
| 3,631,781 A * | 1/1972 | Kennington et al. | 396/2 |
| 4,249,331 A | 2/1981 | Vernon | |
| 4,959,670 A * | 9/1990 | Thayer, Jr. | 396/2 |
| 5,262,815 A | 11/1993 | Aumiller | |
| 5,446,515 A | 8/1995 | Wolfe et al. | |
| 5,478,129 A | 12/1995 | Goto et al. | |
| 5,546,316 A | 8/1996 | Buckley et al. | |
| 5,597,231 A | 1/1997 | Rosset | |
| 5,623,581 A | 4/1997 | Attenberg | |
| 5,784,651 A | 7/1998 | Mauchan | |
| 6,085,195 A | 7/2000 | Hoyt et al. | |
| 6,252,358 B1 * | 6/2001 | Xydis et al. | 315/295 |
| 6,298,197 B1 | 10/2001 | Wain et al. | |
| 6,317,560 B1 * | 11/2001 | Kawabata | 396/2 |
| 6,519,596 B1 * | 2/2003 | Hoyt et al. | 1/1 |
| 7,064,498 B2 * | 6/2006 | Dowling et al. | 315/291 |
| 7,167,643 B2 | 1/2007 | Nakanishi et al. | |
| 7,182,496 B2 | 2/2007 | Ruffin | |
| 7,482,565 B2 | 1/2009 | Morgan et al. | |
| 7,626,611 B2 | 12/2009 | Nakanishi et al. | |
| 2001/0021109 A1 * | 9/2001 | Schleifer | 362/231 |
| 2002/0048169 A1 * | 4/2002 | Dowling et al. | 362/234 |
| 2003/0112639 A1 | 6/2003 | Stack | |
| 2008/0310829 A1 | 12/2008 | Bakewell | |
| 2009/0046465 A1 | 2/2009 | Hashimoto et al. | |
| 2010/0008657 A1 * | 1/2010 | Gassman et al. | 396/2 |
| 2011/0069944 A1 * | 3/2011 | Johnson | 396/2 |

FOREIGN PATENT DOCUMENTS

| | | |
|---|---|---|
| EP | 0785460 A1 | 7/1997 |
| GB | 2412521 A | 9/2005 |

* cited by examiner

*Primary Examiner* — Clayton E LaBalle
*Assistant Examiner* — Kevin Butler
(74) *Attorney, Agent, or Firm* — Gifford, Krass, Sprinkle, Anderson & Citkowski, P.C.

(57) ABSTRACT

A photo booth incorporating LED lighting elements configured for causing a polycarbonate resin thermoplastic outer sheeting of the booth having translucent properties to exhibit a desired color, pattern or sequence. The body and associated polycarbonate sheet are typically constructed in an arcuate (rounded or ellipsoidal) shape to create an internal space sufficient for mounting the LED lighting elements as well as the associated interior architecture for operating the booth. An external processor control interfaces with the internal processor associated with the architecture of the booth and for operating such as a digital camera and printer. Security hardware and software components are also provided and for ensuring against non-authorized use of the booth.

20 Claims, 12 Drawing Sheets

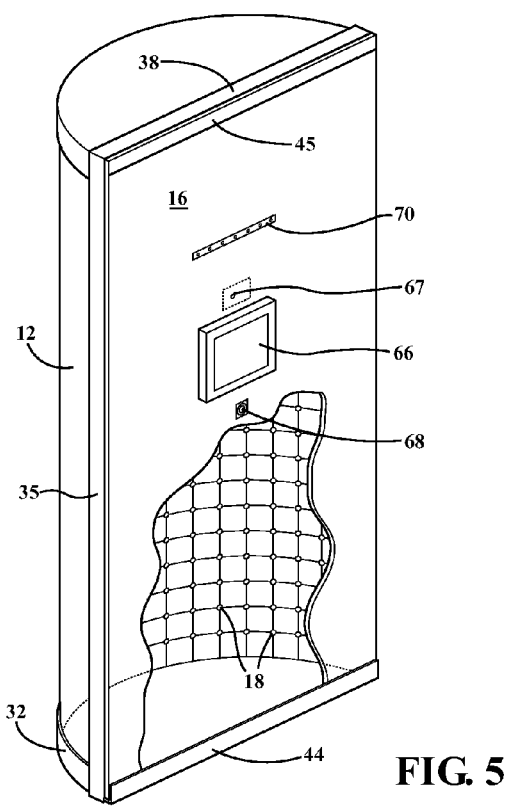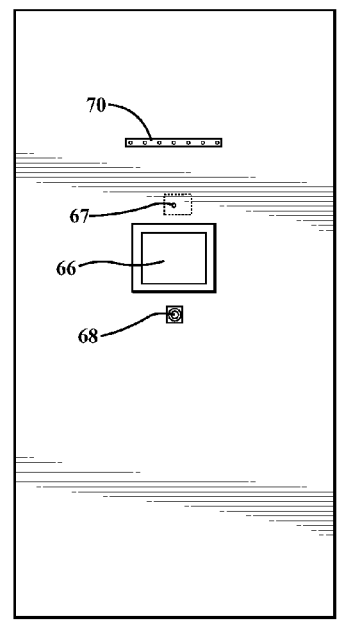
FIG. 5  FIG. 5A

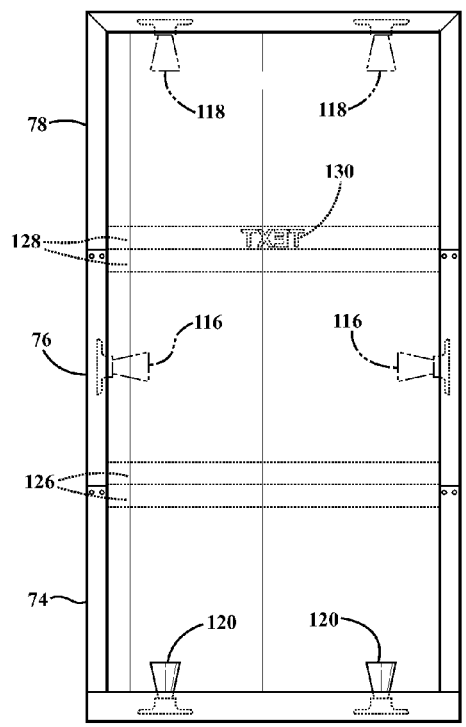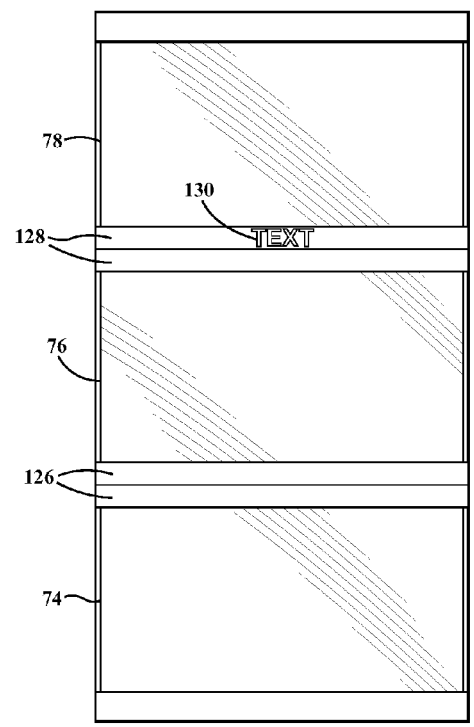
FIG. 7　　　　　　　FIG. 8

LIGHTING MODIFIABLE PHOTO BOOTH WITH EXTERNAL PROCESS CONTROL

CROSS-REFERENCE TO RELATED APPLICATIONS

This application claims the benefit of U.S. Provisional Application 61/308,398 filed on Feb. 26, 2010.

FIELD OF THE INVENTION

The present invention discloses a light modified and color changing photo booth incorporating any degree of translucent to transparent construction and providing at least one three dimensional upward extending and structural defining (typically arcuate configured) end portion. A plurality of LED or other suitable illuminating elements are configured within an interior of the structural body. An internal or external processor control is communicated to the LED's and other interior electronic architecture associated with the photo booth in order to achieve any desired combination of lighting patterns, such further in cooperation with a musical and/or thematic event at which the photo booth can be associated.

BACKGROUND OF THE INVENTION

The prior art is well documented with examples of photo booths, kiosks or the like. Reference is made to such examples as the automatic picture taking machine in Wolfe et al., U.S. Pat. No. 5,446,515, the photo booth with module construction in Mauchan U.S. Pat. No. 5,784,651, the automatic photo booth with electronic imaging camera in Wain et al., U.S. Pat. No. 6,298,197, the internet phone booth of Hoyt et al., U.S. Pat. No. 6,085,195, and the direct view interactive photo kiosk and image forming process for the same, in Attenberg, U.S. Pat. No. 5,623,581.

SUMMARY OF THE INVENTION

The present invention discloses a light emitting color changing booth including at least one three dimensional shaped and upwardly extending and frame defining body exhibiting a light transmitting surface such as established by a polycarbonate resin thermoplastic sheet exhibiting any desired degree of transparency/translucency. A plurality of LED elements are incorporated and arranged in some desired fashion mounted within the structural defining body inside the polymeric sheet and, upon being illuminated, are visible through its transmitting surface.

The resin sheet can also be removable from the frame component associated with the three dimensional height extending body and can be replaceable with additional like shaped (typically rounded or arcuate) sheets exhibiting different colors. Such interchangeability can further entail suitable channel support and bracket structure incorporated into the body for facilitating installation of a selected arcuate extending sheet. Subset design considerations can also include a laser cut metal band or ring formed with the polycarbonate sheet and which displays an operator's name or logo in a highlighted fashion upon illumination of the internally located LED elements.

It is also envisioned and understood that a standard clear translucent sheet can be permanently mounted to the body, with the internally positioned LED elements being structurally modified to provide any desired range of solid or changing colors (such as in association with the internal processor structure incorporated into the assembly). Such color changing patterns or protocols may or may not further be related in some fashion to an event or theme associated with the location of the booth.

The booth assembly can include either a single arcuate defining body from which extends a looped enclosure frame and curtain. Alternatively, first and second opposite end located and arcuate defining sections can be provided, such that a pair of curtain supported (and optionally telescopic) sections extend between the sections to define the inner enclosure space.

It is also understood that the body section or sections can be provided in either a clamshell first variant in which opposite end sections are collapsed together. A height-separable and stackable second variant is also provided in which a plurality of (such as three) subsections are erected to define the overall height of the body section. A front panel associated with the second variant, and which may be installed upon stacking the connecting the individual and arcuate defining body subsections, may also include an intermediate hinged location to facilitate folding the panel to a reduced size during transport.

Either variant provides portability during transport and ease of reassembly. It is also understood that wheels or other suitable castor supports can be provided along bottom proximate locations of the body sections to facilitate additional transport or movement.

An inner architecture associated with a primary selected body section can include built in components such as a video monitor, digital camera, and activation controls in order to permit a user of the booth to have taken and to, optionally, print out pictures on site or to have such pictures electronically delivered such as to an email address specified by the user. In the instance of on-site photo printout, a printer may also be built into the body section or can be separately provided by an end user (e.g. such as a renter or licensee of the assembly). The body is further configured (in either the height extending and integrally formed or height-subsection collapsible variants) such that the inner architecture is accommodated in the body construction in a cooperating and non-interfering fashion relative to the inner supported and illuminating LED display.

An external driving component of the processor can be remotely located and communicated via an Ethernet wire or wireless connection with the internal processor architecture associated with the booth for directing a pattern of colors and sequences to be emitted by the LED elements and visible through the translucent arcuate sheet. The external processor includes a desired combination of hardware and proprietary software components and is intended to manage, guide and control certain operations associated with the photo booth via a remote control interface. Such controlled operation can further include the provision of a software protection dongle, which is a small piece of hardware plugged into any of a laptop, desktop or server and which can further be activated through a cellular tower or the like to provide copy protection (e.g. selected multiple copies of photos) and authentication of software to be used on the specified processor driven system.

In operation, a dongle will allow an operator/lessor of a remote located booth to require and facilitate an end user lessee to make electronic incremental payments, such as through an associated payment protocol, for obtaining specified post term iterative operation cycle of the booth and, in the absence of payment, to cause deactivation of the booth. The associated hardware component may incorporate functionality which prevents unauthorized use outside of the iterative (e.g. dongle) downloaded authorization/license.

BRIEF DESCRIPTION OF THE DRAWINGS

Reference will now be made to the attached drawings, when read in combination with the following detailed description, wherein like reference numerals refer to like parts throughout the several views, and in which:

FIG. 5 is a perspective view of an inner panel defining a forward end supporting component, partially cutaway, and illustrating an arrangement of LED elements incorporated within the light transmitting surface associated with the outer arcuate positioned polycarbonate resin sheet;

FIG. 5A illustrates a further plan view of the panel cover and interior architecture supporting structure of the photo booth and which includes such features as video monitor, camera and activating/push button incorporated into a wood paneling or other inner planar surface;

FIG. 7 is a front plan view of a translucent end section similar to that depicted in FIG. 6 and in which a redesigned plurality of LED elements are depicted in phantom extending along side and top locations in addition to upwardly from a bottom, optionally exterior positioned, pedestal support surface;

FIG. 8 is rotated exterior view of the assembleable end section in FIG. 7;

DETAILED DESCRIPTION OF THE PREFERRED EMBODIMENTS

Figure 1:
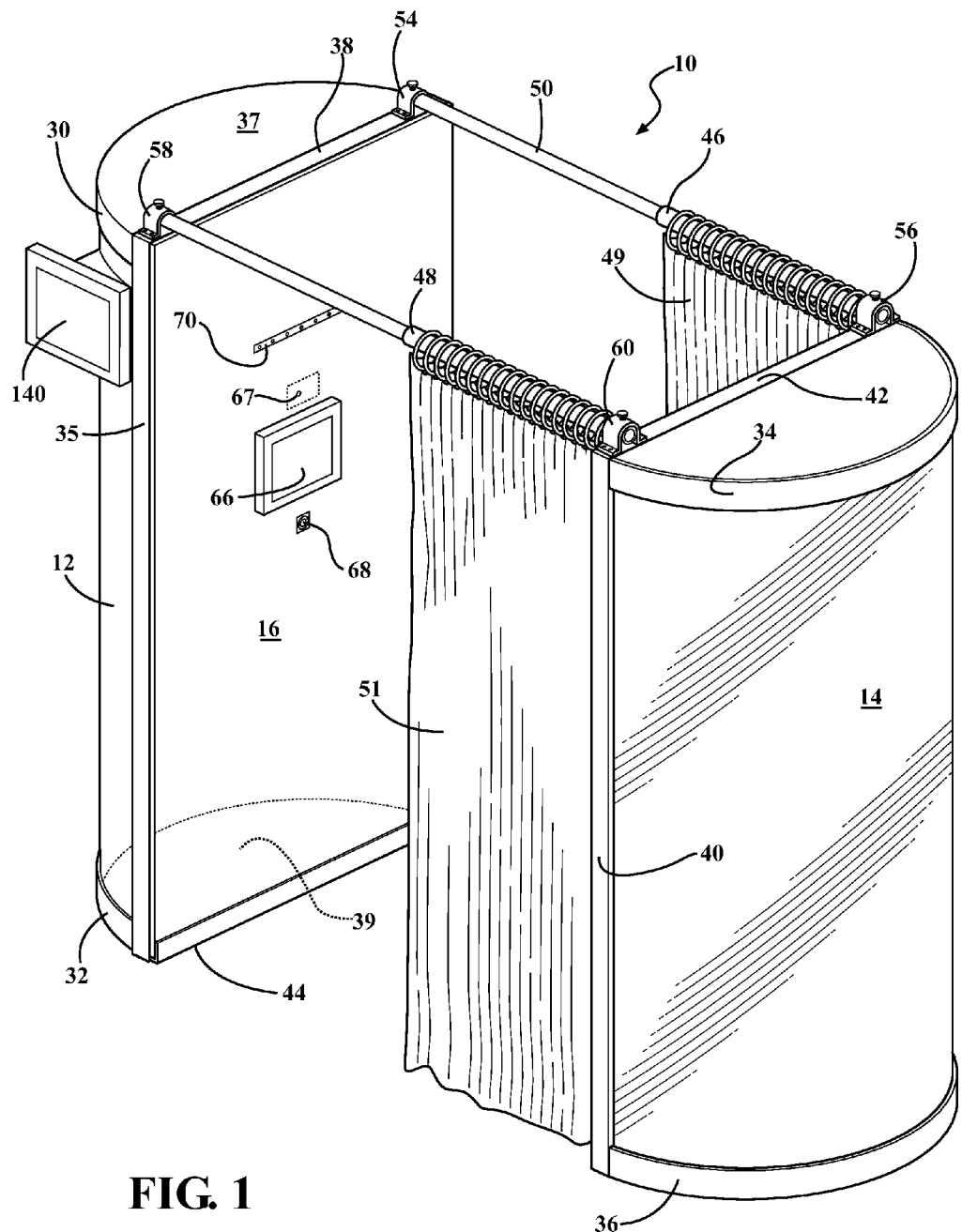
FIG. 1 is a perspective view of a photo booth construction according to one embodiment of the present inventions.

Referring to the perspective view of FIG. 1, the present invention discloses a photo booth construction, generally at 10, according to one embodiment of the present inventions. As will be disclosed with reference to the several views presented, the invention teaches either a mobile/collapsible or fixed photo both exhibiting any type of arcuate (rounded) or polygonal end sections interconnected by elongate supports. The end sections exhibit a translucent to transparent construction (including such as any suitable polycarbonate or other resinous sheet material exhibiting a specified bend or arcuate profile and into which are incorporated light emitting diode (LED) elements responsive to a powered processor control for instructing the LED's to emit any single or multiple combination of colors visible through the translucent construction of the polycarbonate sheet, such being according to any color duration and/or pattern.

As further referenced in the initial variant of FIG. 1, the example of the photo booth illustrated includes a first forward section 12 (depicting a first arcuate polycarbonate translucent sheet) and a like rear section (arcuate sheet) 14. Each of the sections exhibit a generally curved, semi-circular profile however it is understood that each can exhibit any three dimensional and structural supporting shape not limited to multi-sided polygonal or hybrid polytonal and curved profiles which establish any desired outer profile.

The dimensional extending surfaces incorporated into each arcuate sheet 12 and 14 include any type of light permitting material, this ranging from a partially light transmitting/translucent material up to a fully light permitting/transparent clear material. In one non-limiting variant, the panel construction incorporates a polycarbonate sheet such as is commercially known as a 70/30 Lexan® material.

An overlaying panel, see at 16, is proved and as further depicted in FIG. 5 is partially removed in cutaway to reveal a plurality of LED elements 18 which extend across the inner arcuate surface of the polycarbonate sheet. As further referenced in the initially illustrated example of FIG. 1 and referring also to FIG. 3 in combination with a similar arrangement incorporated into the sheet 14 of the corresponding spaced apart rear section, an external processor control 20 (such as which can include a computer and printer) provides a series of input signals (see via line 22) to the LED's incorporated into each of the front section 12 and (via interconnecting and built or wireless architecture) rear section 14, as well as further receiving output signals (such as along a common video/USB input line) for printing photos taken from the booth and for providing other two way interfacing communication and operational criteria between the booth architecture and the outside processor 20. Both the processor 20 and booth 10 can include portable power modules or, and as shown in the illustrate embodiment, can include AC/DC cords and plugs (at 24 and 26 in FIG. 3) for accessing a local power socket outlet 28.

Additional structural supporting features include the provision of perimeter supporting and interconnecting angle iron (such as 2" in width in one non-limiting variant) and which extends in inter-connecting fashion along the sides and arcuate top and bottom of each of the front 12 and rear 14 sections.

Figure 3:
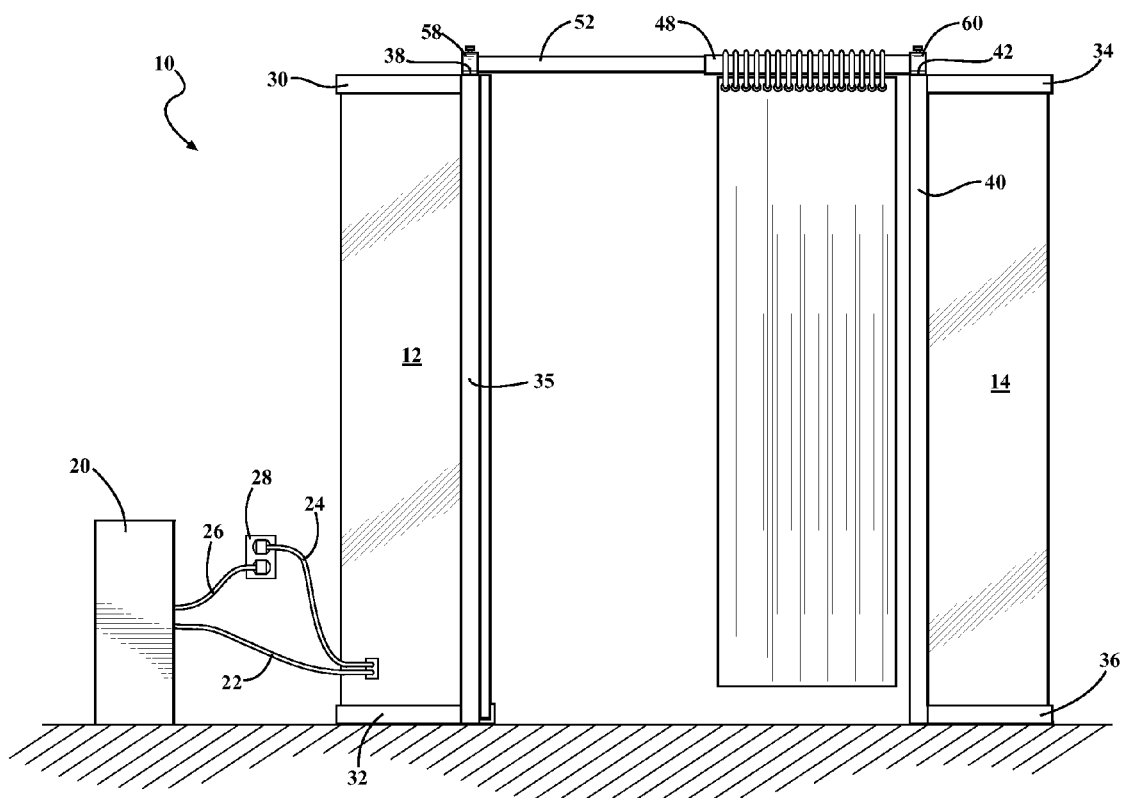
FIG. 3 is a side plan view of the photo booth construction as generally depicted in FIG. 1 and further illustrating the feature of the external processor.

These are best shown in each of FIGS. 1 and 3, as top 30 and bottom 32 bands associated with first arcuate section 12 and corresponding top 34 and bottom 36 bands associated with second arcuate section 14.

FIGS. 1 and 3 further depict additional and inner perimeter/linear edge extending bands of material, see as visible at 35 and 38 for end section 12 and further at 40 and 42 for end section 14 which is secured in overlaying fashion along inner perimeter extending edges of the polycarbonate sheet, such as by mechanical adhesives, heat staking/welding or optionally through the use of rivets or other types of mechanical fasteners which provide strength and rigidity to the upstanding end sections. It is further understood that top and bottom semi-circular portions (see as generally depicted at 37 and 39 in FIG. 1) can represent either additional translucent surfaces associated with the polycarbonate sheet or can also be provided as additional supporting plates for assisting in the construction of the end sections.

Figure 1A:
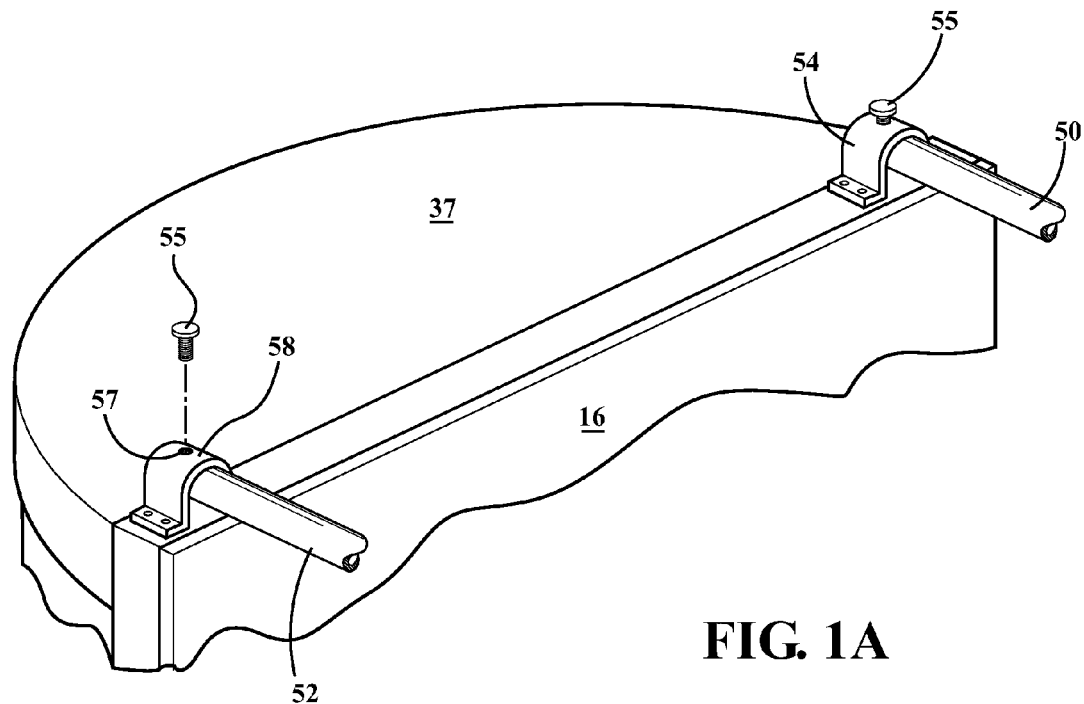
FIG. 1A is an exemplary and non-limiting enlarged perspective of one possible mounting arrangement for securing a supporting rod structure to an elevated location associated with a selected end section of the booth.
Figure 1B:
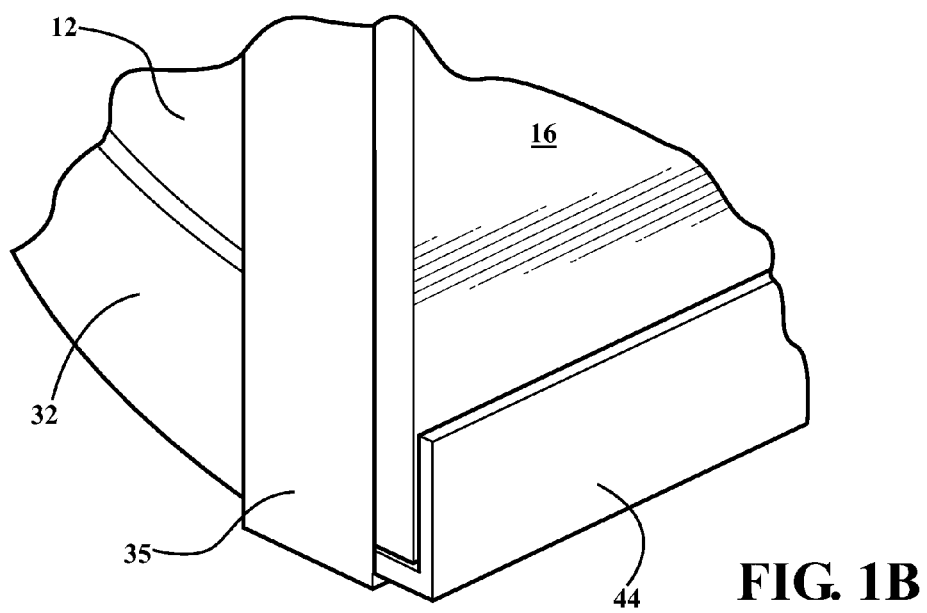
FIG. 1B is a further enlarged perspective of a lower corner location of the booth end section and illustrating the manner in which the inner panel, outer frame trim and polycarbonate resin translucent sheet material are constructed.

As further depicted in FIG. 1B, a further enlarged perspective of a lower corner location of the booth end section illustrates the manner in which the inner panel 16, outer frame trim 32 and 35 and polycarbonate resin translucent sheet material 12 are constructed and assembled. Specifically, a bottom angled iron bracket 44 is illustrated and which supports the panel 16 along a bottom extending edge between opposite arcuate sides associated with the polycarbonate resinous and translucent sheet 12. As shown in FIG. 5, a like upper bracket 45 can also be provided extending along a top edge of the end section 12.

Figure 4:
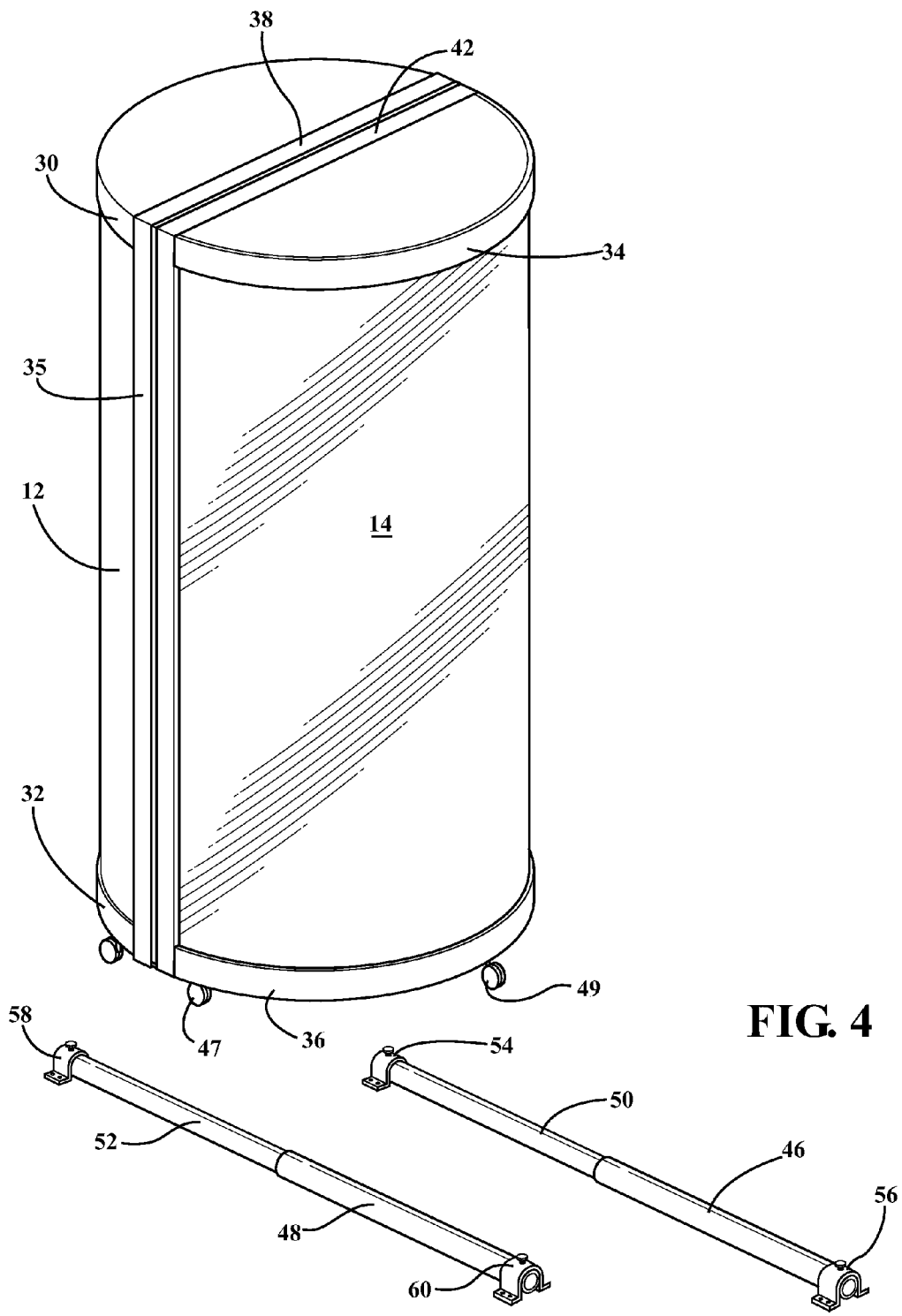
FIG. 4 is a collapsed assembly view of a photo booth in combination with exploded illustration of associated connecting structure according to one transportable variant and further depicting the potential application of wheeled support castors according to any of a number of permanent, actuating or removably attachable variants.

Additional features include upper end extending linkages or support arms (as shown in assembled fashion in FIG. 1 and further in disassembled form in FIG. 4). The support linkages in one non-limiting example can include outer elongated members 46 and 48 within which respectively are telescopically seated and length adjustable inner members 50 and 52, each of the linkage pairs supporting a selected length of upper ring supported and traversable curtain, at 49 and 51.

Suitable wheel or castor supports, at 47 and 49, can also be utilized in the collapsed (transportable) variant of FIG. 4 to facilitate movement of the booth assembly either within a facilitate or during transport/shipping. The wheels or castor supports (see also FIG. 6) can be used in either or both the end sections and which permits the assembled booth to be moved without the need for disassembly. Additional locking or actuating structure can be employed in the wheels to prevent inadvertent and undesirable movement of the booth.

As further best shown in FIG. 1A, an exemplary and non-limiting enlarged perspective of one possible mounting arrangement includes an upper corner edge bracket support 54 (see also additional associated end supports 56, 58 and 60 for each of the upper end extending telescoping assemblies) is provided for securing a supporting rod structure to an elevated location associated with a selected end section of the booth assembly 10. The corner supports 54, 56, 58 and 60 are illustrated as arcuate clamps which secure to front edge surfaces of the upper semi-circular plate 37 and through which inserting ends of the tubular sections 46, 48, 50 and 52 insert. Also shown are threaded fastening screws (such as like an Allen head type screw 55 which threadable seats through and interiorly threaded interior 57 associated with selected support 54. It should be further noted that the selected corner engagement best shown in FIG. 1A can be substituted by any type of reconfigured hardware or mounting bracketry for mounting the associated telescoping ends to any suitable support location associated with the vertically extending end sections 12 and 14.

Figure 2:
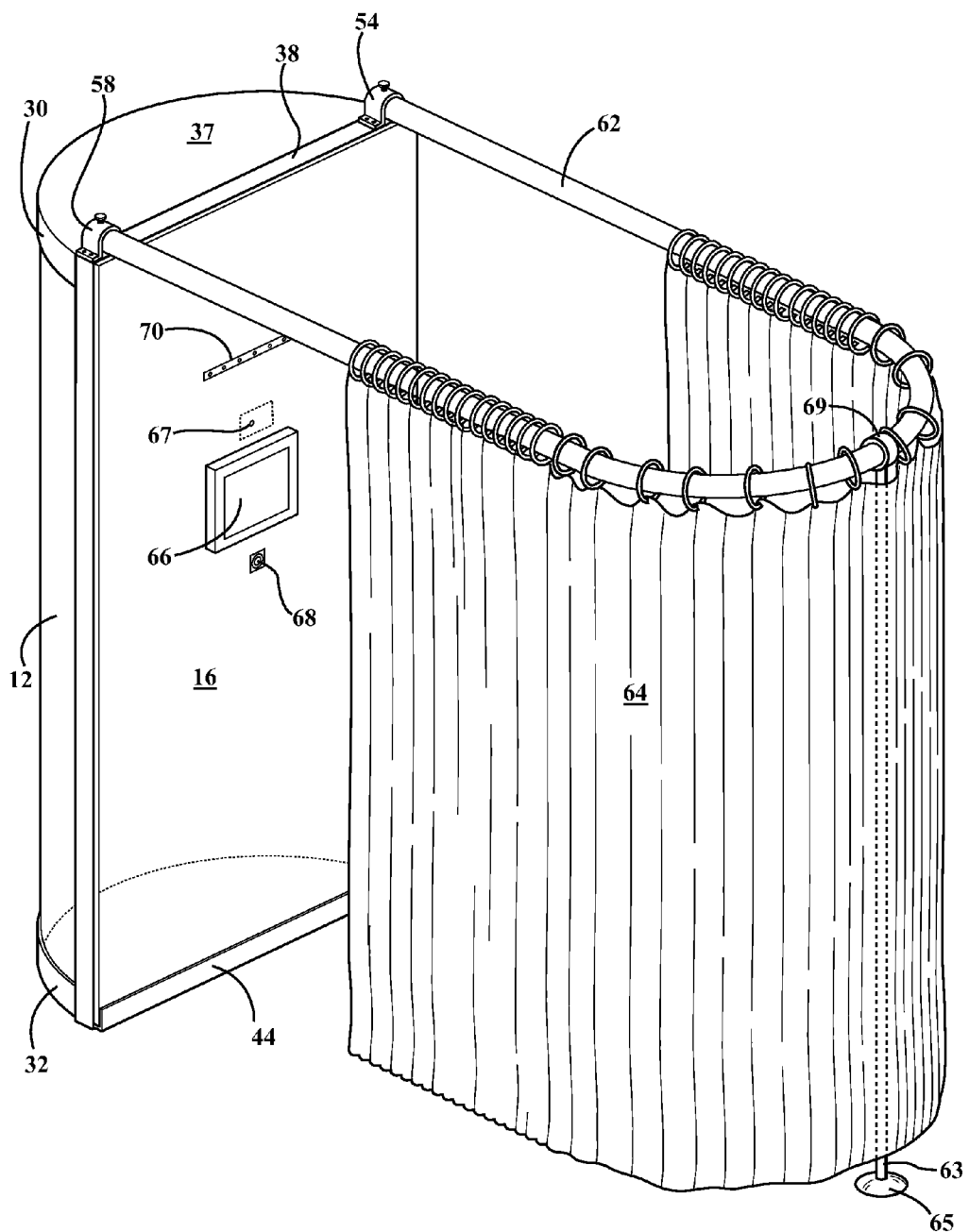
FIG. 2 is a perspective view of a photo booth construction similar to FIG. 1 and depicting a single arcuate end section in combination with an elongated and "U" curvature curtain supporting rod for creating a desired enclosure space.

As further depicted in FIG. 2, a perspective view of a photo booth construction similar to FIG. 1 and depicting a single arcuate end section 12 provided in combination with an elongated and "U" curvature rod 62 for supporting a single and lengthened curtain 64 in order to create a desired enclosure space. A pedestal support 65 can be provided at a remote midpoint location of the elevated "U" rod 62 and which includes a vertical extending member 63 terminating at a top edge in a circular or like suitable clamping member 69 for engaging a midpoint location of the "U" shaped rod 62 and to maintain the structural integrity of the assembly.

As again depicted in FIG. 4, the construction of the booth assembly of FIG. 1 is such that, in the portable variant, the front 12 and rear 14 sections can be collapsed in a clamshell manner in combination with the upper end extending and interconnecting structures 46/48 and 50/52 being removed along with the bracket or other supports 54, 56, 58 and 60 associated with the upper end section locations. It is further understood that the booth can also be provided as a permanently affixed stand alone article.

The inner panel 16 associated with each of the variants of FIGS. 1 and 2, and as further shown in FIGS. 5 and 5A incorporates each of a video monitor 66, (digital) camera 67 and push/activation button 68. A top positioned fluorescent bulb 70 can also be incorporated into the front panel 16. These components can be interconnected either by hidden wires or, alternatively, via wireless (Bluetooth®) technology in order to facilitate taking pictures in the normal fashion.

FIGS. 5 and 5A again further illustrate both cutaway perspective and front plan views, respectively, of a selected structurally supporting front end section associated with the photo booth, whereas the rear end section 14 (FIGS. 1, 3 and 4) can optionally include only the arcuate polycarbonate sheet with or without an inner panel. The support structure and lighting connects are arranged within the interior semi-circular space associated with the forward end section of the booth. A hinged shelf can be provided along an inside face of the fascia panel 16 in order to privotally support the camera 67 (the camera otherwise being affixed to a bracket or other suitable supported affixed directly to a rear surface of the panel 16), such shelf (not shown) capable of being removed upon being pivoted from an upper use position to a downward removal position. Additional quick disconnects (not shown) can also be located in accessible fashion for such as data/LED lighting input and power to adjoining lighting elements, such as located in separate rear booth section 14.

In use, the LED's 18 built into the front and rear polycarbonate sheets are capable of emitting any solid or flashing coloring to either or both the exterior or interior of the booth. In one non-limiting variant, the photo booth can match with over one million colors utilizing advanced LED technology. The emitted light pattern or color of the photo booth can also be processor/computer controlled with any sub-set number of LED elements in use with associated and commercially available lighting software, such as which enables changes in the color patterns to be controlled as preprogrammed shows, as well as sound activated. The desired projected color can further optionally include any of a static (solid) color, a fading between colors, a snap between colors, or a strobe pattern.

In particular applications, the colors employed by the present assembly can include any of those of a particular benefit to an end user, such as including a color array which matches those of a company themed event (such as for image branding purposes), a given holiday or personalized occasions associated with the holiday, or any color or backdrop imaging (such as again associated with an inner visually accessible surface of the rear end section) at the desire of the user. It is further envisioned that the LED array can be programmed to project, in addition to random colors, any logo, photo or other image either singularly or in combination with color patterns through the visible surfaces of the polycarbonate sheeting.

Alternate to the trim angle iron supporting each booth section, it is envisioned and understood that modified angle iron pieces can be fashioned and which exhibit an inner spaced ledge which in combination with the outer exterior shelf, provide a space for receiving and restraining the polycarbonate and arcuate insert sheets. In this fashion, it is envisioned that the upper, lower and side extending and supporting bracketry can allow for quick disassembly of the panel 16 and for substitution of the arcuate polycarbonate sheets 12 and 14 with any substitute and like shaped sheets or sections which may exhibit a different color pattern or scheme.

Figure 6:
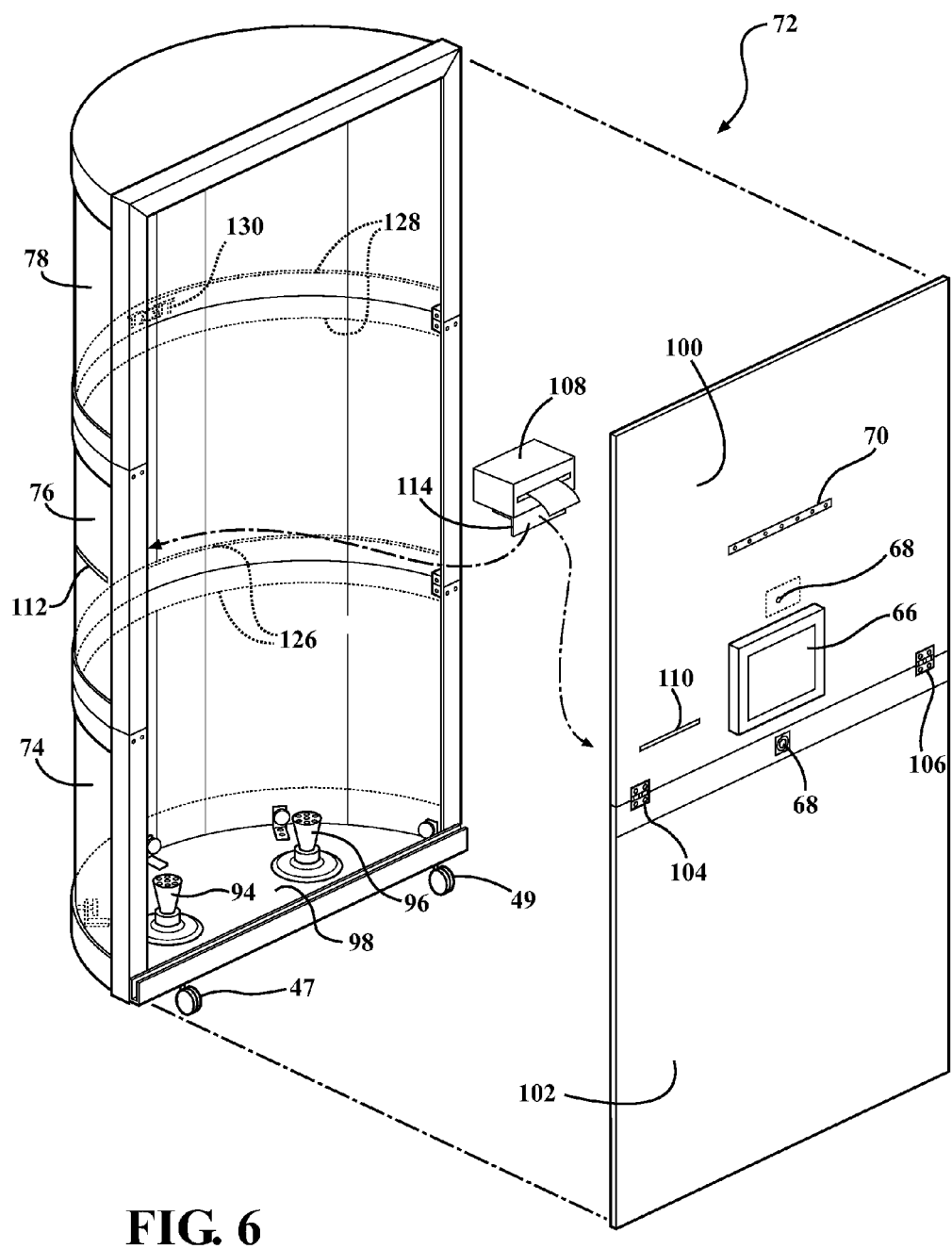
FIG. 6 is an exploded illustration of the selected booth end section according to a further variant in which the end sections are provided as a plurality of individual and height stackable components and exhibiting a collection of features including a further variant of inner arranged LED elements, a hinged/foldable inner panel covering and an optionally mounted or supported portable printer integrated within the body interior and capable of issuing prints through either of interior or side accessible locations.
Figure 11:
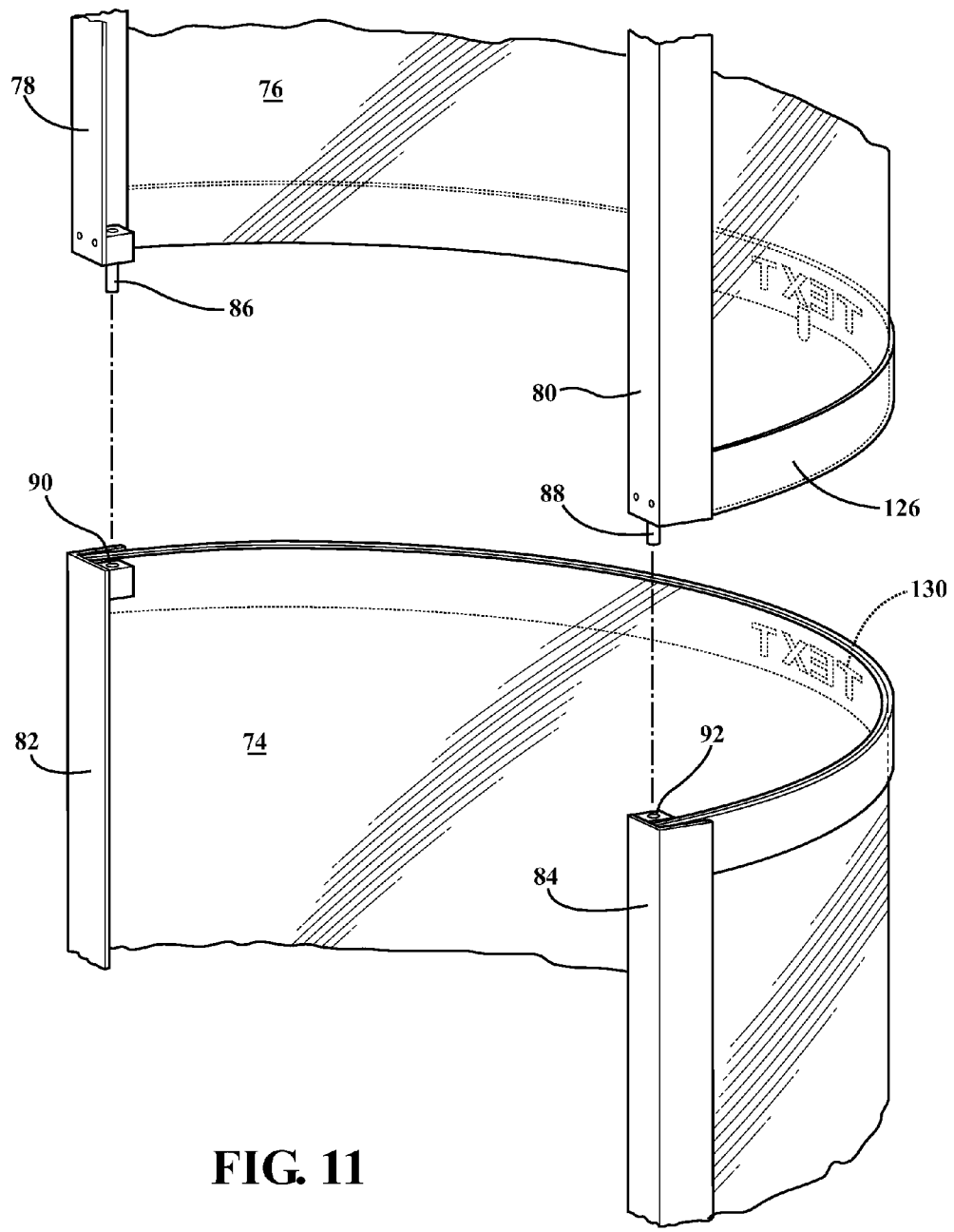
FIG. 11 is an enlarged partial and exploded perspective of a selected pair of stackable sub-sections and illustrating the tab and slot arrangement established therebetween to facilitate assembly.

Referring now to FIG. 6, an exploded illustration is provided generally at 72 of a selected booth end section according to a further variant in which the end sections are provided as a plurality of individual and height stackable components 74, 76 and 78. As further shown in FIG. 11, an enlarged partial and exploded perspective of a selected pair of stackable subsections 74 and 76 illustrates a tab and slot arrangement established therebetween to facilitate assembly of the individual sections. This includes vertical angle iron portions (at 78 and 80 for upper located section 76 and 82 and 84 for lower positioned section 74) supporting the individual polycarbonate sheet sections including additional pole or tab end projecting portions, at 86 and 88 extending downwardly from associated section 76, seating within vertically accessible slot locations 90 and 92, extending in opposing aligning and communicable fashion within lower positioned subsection 74. For ease of illustration, duplicate male/female interconnections are established for each of the assembleable subsections, of which three are illustrated in one non-limited embodiment.

FIG. 6 depicts a further variant of LED structure in which a pair of inner and bottom located LED elements are shown at 94 and 96 positioned upon an inner base plate location (at 98) and illuminating upwardly/outwardly and so that the light pattern is equally dispersed along the inner surfaces of the polycarbonate sheet and so that a consistent translucent light bleeds through to the exterior thereof.

Figure 1C:
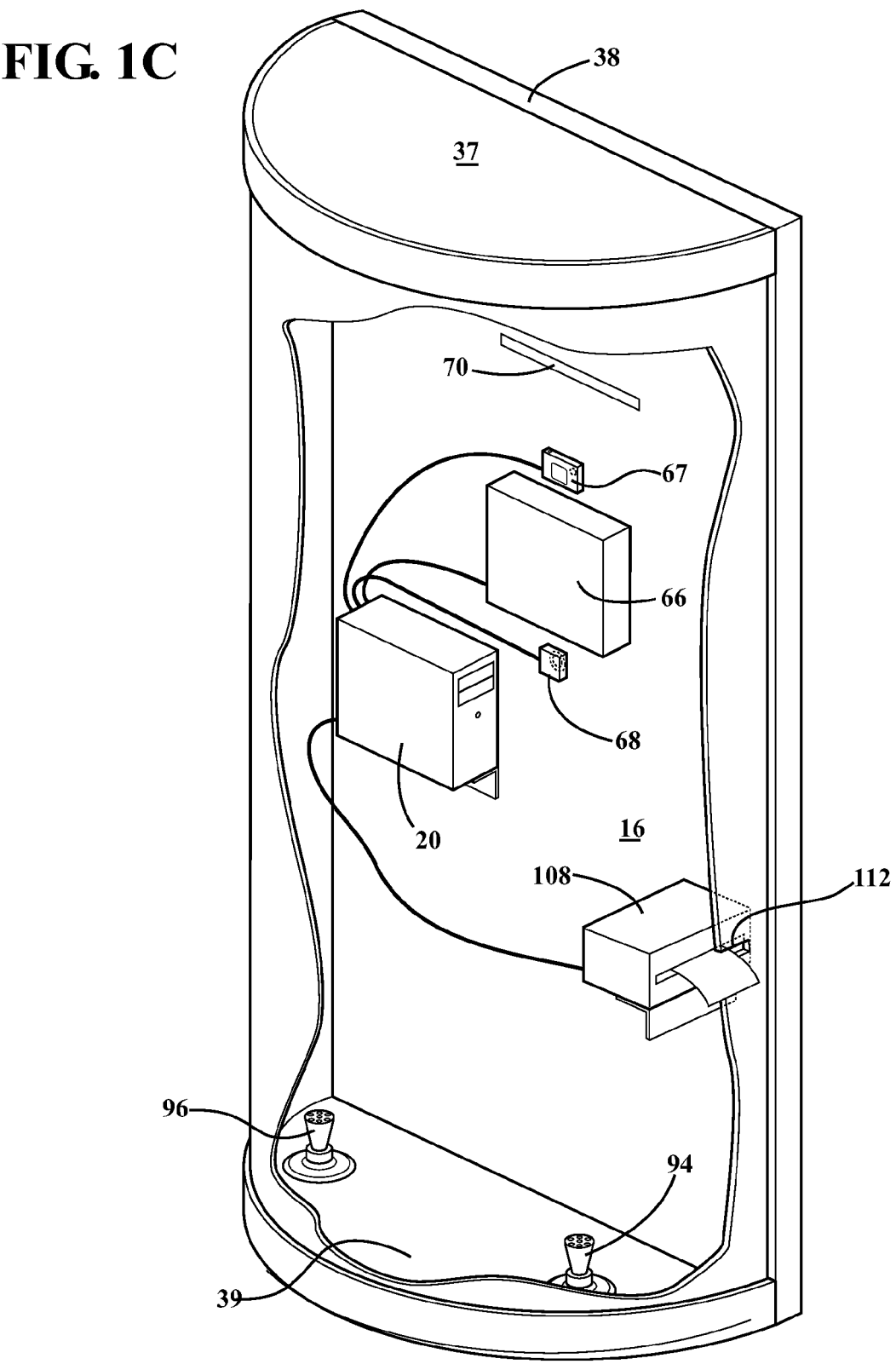
FIG. 1C is a reverse perspective of a selected end section and illustrating one preferred arrangement of processor, camera, monitor, push button and printer all mounted to a reverse face of a structurally supporting front panel for taking photos and dispensing through an exterior side slot location associated with the arcuate light transmitting sheet.

A panel includes first 100 and second 102 sections with intermediate hinged locations 104 and 106 for permitting the panel to be folded in half during storage or transport. An optionally mounted or supported portable printer 108 is integrated within the body interior and is capable of issuing prints through either of interior 110 or side accessible 112 slot locations as indicated. The printer 108 can be mounted in any desired fashion within the assembled interior of the designated end section (such as supported upon a stool or bench or more desirously at an elevated location upon an inner fastened bracket or support as depicted in FIG. 1C and in proximity to a likewise intermediate positioned and side disposed slot 112 formed through the translucent surface 12). As further depicted in FIG. 6, this can again include the provision of an underside supporting bracket 114 for securing to an inside of either a hinged panel location or a further location associated with the arcuate translucent sheet in order to arrange the printer at a more elevated location and so that it dispenses pictures through the desired slot location.

As further depicted in FIG. 1C, a reverse perspective of a selected end section 12 drawn from the first disclosed variant illustrates one preferred arrangement of processor 20, camera 67, monitor 66, push button 68 and printer 108 all mounted by any combination of clips, shelf supports or other bracketry to a reverse face of a structurally supporting front panel 16 for taking photos and dispensing through exterior side slot location 112 associated with the arcuate light transmitting sheet. As previously described, the printer 108 can be repositioned at any location with respect to the specified end section assembly and so that the pictures can be dispensed, without limitation, along any of the front, sides, top or bottom of the outer arcuate surface 12. In this fashion, all of the inner hardware and operating components can be wired together in close adhering proximity to the reverse face of the supporting panel 16 in non-interfering fashion with the placement of the various LED elements and their translucent illumination through the surface of the arcuate sheet 12.

FIG. 7 is a front plan view of a translucent end section similar to that depicted in FIG. 6 and in which a redesigned plurality of LED elements, see at 116 and 118 are depicted in phantom extending respectively along side and top locations, this in addition to an additional bottom located pair of LED lights 120 which are arrayed to point upwardly from an optionally exterior positioned, pedestal support surface associated with the end section. FIG. 8 is rotated exterior facing view of the end section of FIG. 7.

Figure 9:
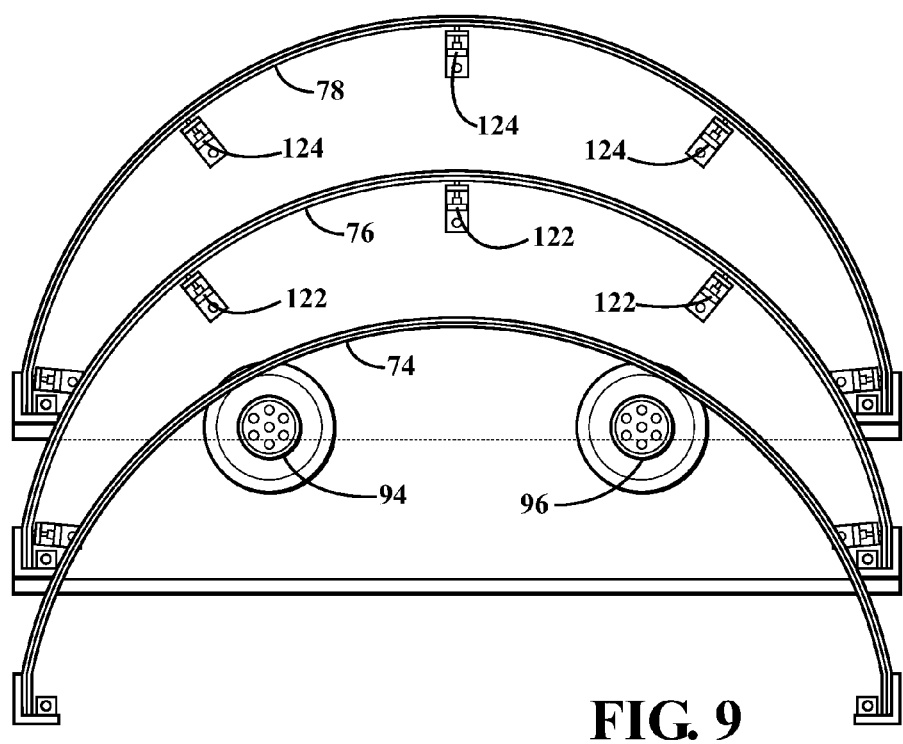
FIG. 9 is an end plan view of a tiered stackable arrangement established by a selected plurality of three individual subsections associated with one end supporting section.
Figure 10:
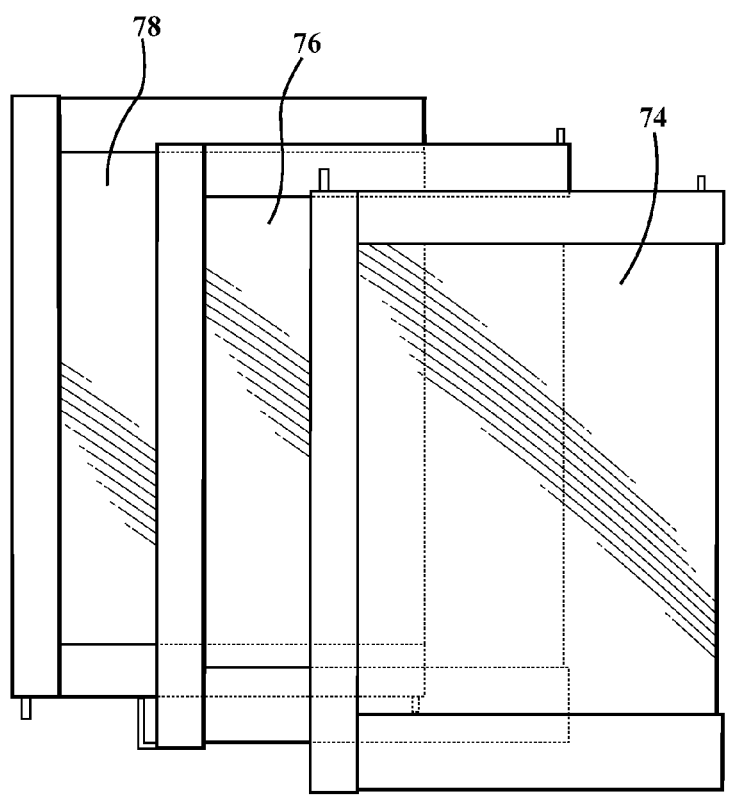
FIG. 10 is a rotated side view of the stackable arrangement shown in FIG. 9.

FIG. 9 is again an end plan view of a tiered stackable arrangement established by a selected plurality of three individual sub-sections 74, 76 and 78 associated with one end supporting section and further depicting bracket supports 122 and 124 associated with selected assembleable sections, such as which can suitably receive a shelf or like support surface for maintaining any of the internal components, such as portable printer, camera, monitor, etc. in secure fashion. FIG. 10 is a rotated side view of the stackable arrangement shown in FIG. 9 and again depicting the collapsed subsections 74, 76 and 78 suitable for transport or storage.

As previously described, the polycarbonate resinous (translucent) sheets or subset sheet sections can again be removable from the frame component associated with the three dimensional height extending body (e.g. again either one piece or stackable three piece construction which would include a total of six pieces for two assembleable end sections) and can be replaceable with additional like shaped (typically rounded or arcuate) sheets exhibiting different colors. Such interchangeability can further entail suitable channel support and bracket structure incorporated into the body for facilitating installation of a selected arcuate extending sheet. Subset design considerations can also include a laser cut metal band or ring, see pairs of aligning band sections at 126 and 128 as specifically illustrated in partially exploded view of FIG. 11 and as assembled in each of FIGS. 6-8, combined with laser band cutout indicia 130. The metal bands are then affixed to the polycarbonate sheet in such a manner that the laser cut location displays an operator's name or other designed logo in a highlighted fashion upon illumination of the internally located LED elements.

Figure 12:
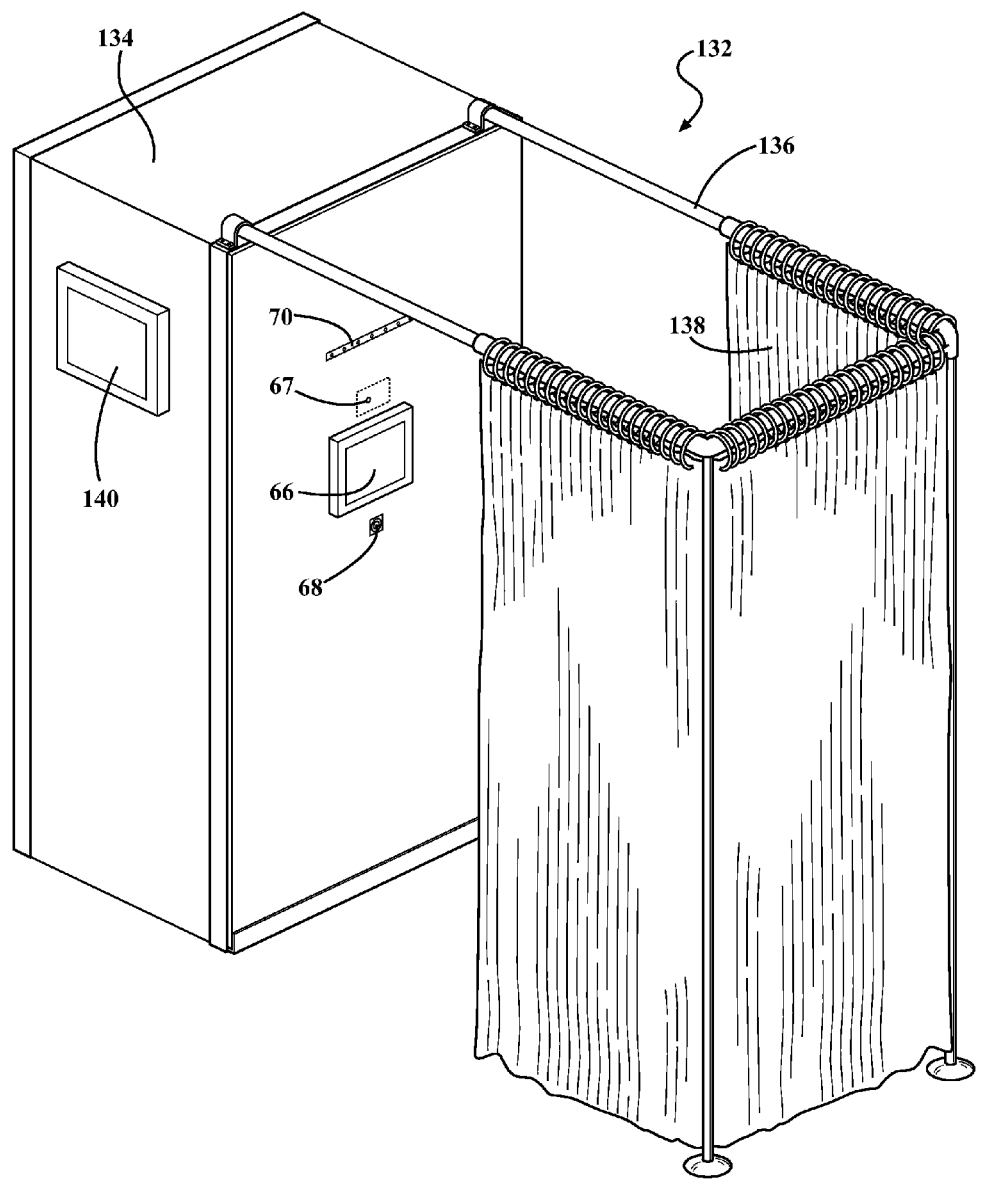
FIG. 12 is an illustration of a further alternate construction of photo booth and which illustrates a rectangular cross sectional shaped end section along with a secondary and exterior mounted monitor in wired interfacing communication with the internally located processor and related components.

Finally, FIG. 12 is an illustration, generally at 132 of a further alternate construction of photo booth and which illustrates at least one rectangular cross sectional shaped end section 134 along with either a secondary extending end section or, as further depicted, a multi-sided curtain 136 and rod 138 enclosure. Also depicted is an external positioned monitor 140 which is in addition to the internal located monitor 66 and is established in wired interfacing communication with the internally located processor and related components (not shown in this view). It is also again understood that the light transmitting or translucent surface and include any non-linear profile, including arcuate, multi-sided (polygonal) or the like as generally represented but not limited by either the rectangular cross sectional profile of FIG. 12 (including either a single or multiple translucent sheets arranged in polygonal interconnected fashion) or the arcuate (generally semi-circular) profiles associated with the variants of FIGS. 1 and 6.

It is also envisioned and understood that a standard clear translucent sheet can be permanently mounted to the body, with the internally positioned LED elements being structurally modified to provide any desired range of solid or changing colors (such as in association with the internal processor structure incorporated into the assembly). Such color changing patterns or protocols may or may not further be related in some fashion to an event or theme associated with the location of the booth.

The booth assembly according to any of the variants described can include either a single arcuate defining body from which extends a looped enclosure frame and curtain or, alternatively, first and second opposite end located and arcuate defining sections can be provided, such that a pair of curtain supported (and optionally telescopic) sections extend between the sections to define the inner enclosure space. This also refers to the variant of FIG. 6 et seq. and which, for purposes of ease of clarity, do not illustrate the curtain and/or telescoping rod structure depicted in each of the initial variants of FIGS. 1 and 2, as well as the optional bottom supporting or actuating wheels or castors.

Also, and in the instance of on-site photo printout as depicted in FIG. 6, the printer may also be built into the body section or can be separately provided by an end user (e.g. such as a renter or licensee of the assembly). The body is further configured (in either the height extending and integrally formed or height-subsection collapsible variants) such that the inner architecture is accommodated in the body construction in a cooperating and non-interfering fashion relative to the inner supported and illuminating LED display.

An external driving component of the processor can be remotely located and communicated via an Ethernet wire or wireless connection with the internal processor architecture associated with the booth for directing a pattern of colors and sequences to be emitted by the LED elements and visible through the translucent arcuate sheet. The external processor includes a desired combination of hardware and proprietary software components and is intended to manage, guide and control certain operations associated with the photo booth via a remote control interface. Such controlled operation can further include the provision of a software protection dongle, which is a small piece of hardware plugged into any of a laptop, desktop or sever and which can further be activated through a cellular tower or the like to provide copy protection (e.g. selected multiple copies of photos) and authentication of software to be used on the specified processor driven system.

In operation, a dongle will allow an operator/lessor of a remote located booth to require and facilitate an end user lessee to make electronic incremental payments, such as through an associated payment protocol, for obtaining specified post term iterative operation cycle of the booth and, in the absence of payment, to cause deactivation of the booth. The associated hardware component may incorporate functionality which prevents unauthorized use outside of the iterative (e.g. dongle) downloaded authorization/license.

Additional to the above description, it is further understood that the photo booth's rear half (see second end section 14 in FIG. 1 and in particular its largely hidden inner surface) is the background for the photos and which can be designed or otherwise modified to allow for easy changing of either background or colors. The push button feature for activating the photo taking process is also understood to provide but one non-limiting example of suitable technology for accomplishing this function and which can also include the use of a touch screen monitor which would make the push button unnecessary.

While illustrating one useful type of lighting element, it is also understood that the present invention is not limited to the use of LED elements within the photo booth, but can also utilize any other form of high intensity, illuminating element such as iridescent light bulbs with colored gel sheets, high powered lamp filaments with colored gel sheets, and the like.

Other features include the photo booth incorporating an external flash for additional photo exposure, as well as the use of an external mounted LCD screen outside the photo booth, such that users can see photos being taken from the previous users in real time. It is also envisioned that the lighting fixtures can be sound activated to synchronize sound and light according to any desired pattern or theme.

Also, the arcuate translucent sheets are not limited to a polycarbonate resinous sheet (e.g. Lexan®), but can also include any of cloth, wood, or any array of material that would benefit from the reflection of colored lighting elements. Also, the curtain depicted herein and such as is used with a single (primary) end section does not have to be U-shaped, but can (without limitation) exhibit such as a 90 degree right angle (aka more boxy appearance), this further contemplating the single or dual end sections also exhibiting a rectangular configuration.

It is also understood that the LED elements, according to any of the disclosed variants, are not required to be connected physically to the computer or processor for the lights to change colors or patterns. Such functionality can be provided, without limitation, by any commercially available remote control. A secondary end section, such as illustrated again by light transmitting/translucent surface 14, can again include any desired arrangement of LED or other high intensity lighting elements and which is also be interconnected by either wired or wireless technology to the processor and various internal architecture associated with the primary end section 12.

Having described my invention, other and additional preferred embodiments will become apparent to those skilled in the art to which it pertains, and without deviating from the scope of the appended claims:

I claim:

1. A color changing photo booth, comprising:
   a three dimensional shaped body incorporating spaced apart front and rear end sections interconnected by upper extending supports, at least one of said end sections exhibiting a non-linear light transmitting surface;
   a plurality of high intensity illuminating elements incorporated into said body and visible through said transmitting surface; and
   a processor for directing a pattern of colors and sequences emitted by said illuminating elements.

2. The invention as described in claim 1, said front and rear sections each further comprising a semicircular shape.

3. The invention as described in claim 2, each of said front and rear sections further comprising a perimeter extending angle trim.

4. The invention as described in claim 2, each of said front and rear sections further comprising top and bottom configured structural support plates.

5. The invention as described in claim 1, at least one of said end sections and said extending supports further comprising collapsible or disassemble-able subassemblies.

6. The invention as descried in claim 5, said collapsible sub-assemblies further comprising a plurality of individual sections supported in a tiered arrangement.

7. The invention as described in claim 5, each of said end sections further comprising a sub-plurality of stackable subsections including male and female connectors established between edge interfacing surfaces associated with each of the individual subsections.

8. The invention as described in claim 7, further comprising at least one laser cut metal band exhibiting a see through indicia, said band being affixed to said light transmitting surface such that the laser cut location is highlighted fashion upon illumination of said illuminating elements.

9. The invention as described in claim 1, further comprising an external processor for establishing operational criteria associated with said processor and at least one of a camera, monitor and a printer associated with said booth.

10. The invention as described in claim 9, further comprising an external driving component of the processor being remotely located and communicated via at least one of an Ethernet wire or wireless connection with an internal processor architecture associated with the booth directing a pattern of colors and sequences to be emitted by said illuminating elements.

11. The invention as described in claim 10, further comprising a software protection dongle providing at least one of copy protection to said printer and authentication of software to be used on said processor.

12. The invention as described in claim 1, further comprising a curtain suspended from each of said upper extending supports and between said end sections.

13. The invention as described in claim 1, said illuminating elements further comprising LED elements arranged along at least one of said bottom, sides and top of said three dimensional shaped body.

14. The invention as described in claim 13, said LED elements being arranged in a spaced grid pattern along an interior of said light transmitting surface.

15. The invention as described in claim 1, said light transmitting surface further comprising a polycarbonate resinous and translucent sheet emitting a specified color.

16. The invention as described in claim 1, further comprising bottom located wheels for transporting said three dimensional body.

17. A color changing booth, comprising:
a three dimensional shaped body exhibiting a non-linear light transmitting surface;
a pedestal supported and "U" shaped upper support extending from said three dimensional shaped body from which is suspended a continuous curtain;
a plurality of high intensity illuminating elements incorporated into said body and visible through said transmitting surface; and
a processor for directing a pattern of colors and sequences emitted by said illuminating elements.

18. A color changing booth, comprising:
a three dimensional shaped body exhibiting a non-linear light transmitting surface;
a cover panel extending between opposite ends of said non-linear light transmitting surface;
a plurality of high intensity illuminating elements incorporated into said body and visible through said transmitting surface; and
a processor for directing a pattern of colors and sequences emitted by said illuminating elements.

19. The invention as described in claim 18, said cover panel further comprising a hinged construction for folding in half during disassembly.

20. A color changing photo booth, comprising:
a three dimensional shaped body having an entranceway leading to an interior of said body, said body further exhibiting an exterior and multi-color light transmitting surface;
a plurality of high intensity illuminating elements associated with said light transmitting surface and which, upon being energized, are viewable from an exterior of said surface; and
a processor in communication with said illuminating elements and, in response to an input signal, directing a pattern of colors and sequences emitted by said illuminating elements.

* * * * *